United States Patent [19]

Bürklin

[11] 4,326,874

[45] Apr. 27, 1982

[54] PROCESS AND APPARATUS FOR PREPARING COMPOSTABLE MATERIAL

[76] Inventor: Werner Bürklin, Sonnhaldenstr. 7, CH-8280 Kreuzlingen, Thurgau, Switzerland

[21] Appl. No.: 19,706

[22] Filed: Mar. 12, 1979

[51] Int. Cl.³ .............................................. C05F 7/00
[52] U.S. Cl. ............................................ 71/9; 71/13; 71/14; 71/901; 71/64.14; 422/184
[58] Field of Search ............... 71/9, 11, 12, 64 JC, 71/14, 21, 24, 901, 64.14; 422/184, 189, 239

[56] References Cited

U.S. PATENT DOCUMENTS

| | | | |
|---|---|---|---|
| 2,867,521 | 1/1959 | Jeffreys | 71/9 X |
| 3,357,812 | 12/1967 | Snell | 71/12 X |
| 4,146,382 | 3/1979 | Willisch | 71/64 JC |
| 4,192,848 | 3/1980 | Willisch | 71/64 JC |

FOREIGN PATENT DOCUMENTS 2520762  9/1975  Fed. Rep. of Germany .......... 71/12

Primary Examiner—S. Leon Bashore
Assistant Examiner—Ferris H. Lander
Attorney, Agent, or Firm—Hane, Roberts, Spiecens & Cohen

[57] ABSTRACT

A method and apparatus for preparing compost material on a storage surface in which a layer of material is produced from strips which are placed with their longitudinal edges adjacent one another and wherein at least one additional layer of compost material is placed on the adjacent strips. In the course of depositing the layers of compost material, hard substances are removed therefrom. The compost material is deposited by a rake-type conveyor member which is capable of being raised and lowered. An aerating device can be provided to loosen the compost material and a pressing device can be provided to produce compact units from the compost material. An aerating system including aerating lances which are movable into and from the compost material can be provided.

7 Claims, 8 Drawing Figures

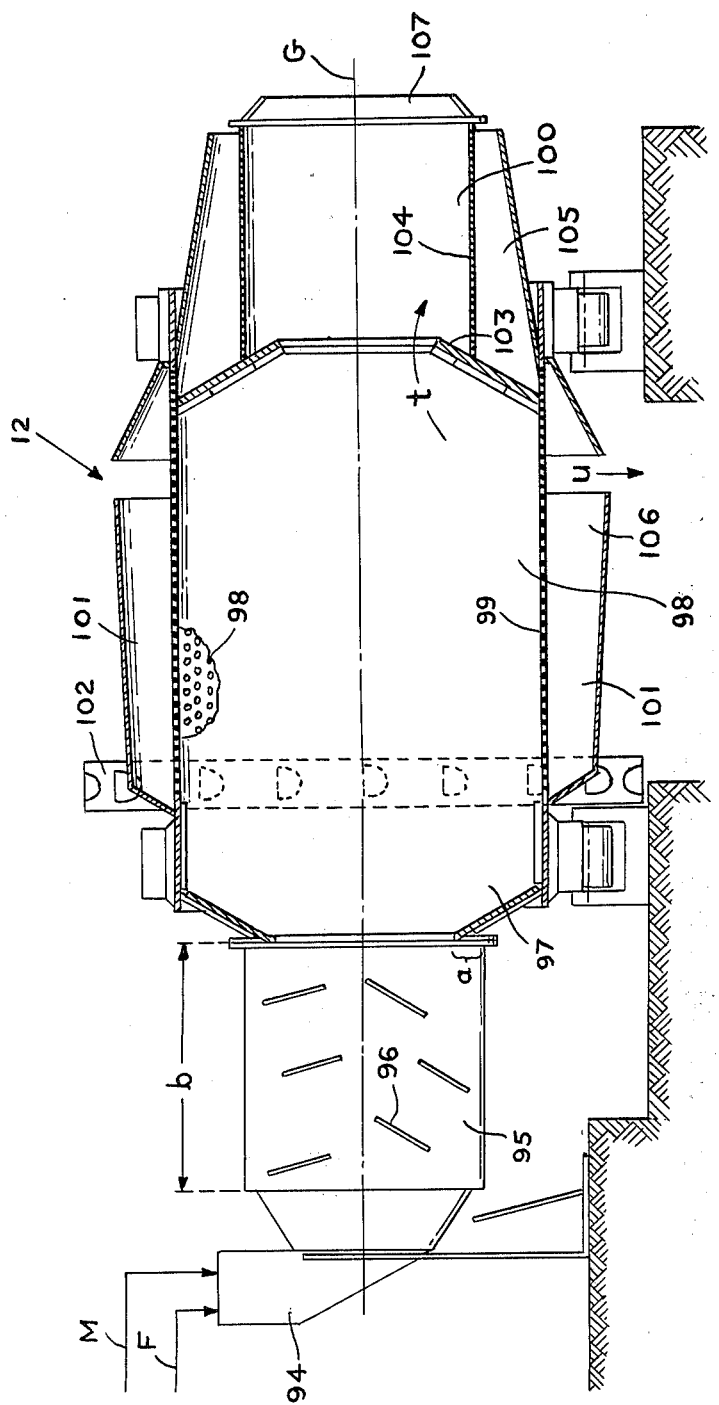

PROCESS AND APPARATUS FOR PREPARING COMPOSTABLE MATERIAL

FIELD OF THE INVENTION

This invention relates to a process and apparatus for preparing compostable material on a storage surface comprising a displaceable loading bridge spanning the storage surface at a distance above it, and a delivery member arranged on said bridge facing said storage surface and connected to at least one conveyor means which brings the material to said member.

BACKGROUND

Ordinarily, compostable material is piled on very large storage surfaces to form compost heaps where it is stored—possibly aerated by ditches—for a relatively long period of time. For the forming of such compost heaps portal frames are known which extend over the storage surface and bear at least one conveyor belt. The latter charges the material fed to it via a loading chute to a drop chute which extends downward in lance shape and from which the compost drops out in part in very large lumps and forms individual conical heaps; these conical heaps produce an undulated surface for the finished compost pile; if it is desired to eliminate this undulation, special smoothing work must be carried out with the use of expensive labor.

A further deficiency has been found in that so-called compost heaps or similar piles are repeatedly turned over or aerated during their existence. For the bottom aerating of such heaps it is known to establish a tunnel system of profiled shapes on the ground before they are produced, the tunnel system forming an air feed system for the finished heap; even after removing the profiled shapes out of the heap a loosened zone remains. This method has the disadvantage that both in the above procedure and in the case of ditches which are dug into the heap only given edge regions are aerated and between them columns of compacted compost or the like remain. Not least of all, this leads to an excessively malodorous heap.

Another problem resides in the relatively large amount of space required. It has been attempted to form the waste materials into compacts in order thereby to reduce by almost two-thirds the space required by the loose heap. It is also believed that compacted waste materials cause less annoyance by odor. For this purpose there are employed ordinary brick presses from which the compacts are removed in a separation operation and loaded onto pallets. The latter are carried by forklift trucks to a piling station and in another operation a dense heap of compacts placed one upon the other is established there.

SUMMARY OF THE INVENTION

In view of the foregoing, an object of the invention is to provide an apparatus and method of the aforementioned type by means of which it is possible to produce heaps which are well aerated in completely automatic fashion. These heaps take up relatively little area—for a given volume—and are not detrimental to the environment. Furthermore, a high efficiency of the system is desired.

In order to achieve this object, a thin layer of compost material of a height of, for instance, 40 mm is produced from strips which are placed with their longitudinal edges alongside each other and at least one additional layer of this type is placed on top; in this connection during the laying of the layer or layers hard substances are removed from the compost material by the accelerating particles of material and separating from each other components having good and poor rebound properties.

In order to be able to produce a compost heap in this manner, a belt-shaped conveyor member which extends over the storage surface is provided approximately horizontally as a delivery member, it being movable, for instance, parallel to the storage surface as well as perpendicular or at an angle thereto. Furthermore, it has proven favorable to provide on the conveyor or loading bridge a milling or similar loosening member which is movable at least vertically with respect to and/or with same—and preferably furthermore variable in position along the loading bridge and with it—and/or at least one pressing device with movable pressing channels or the like for the production of compacts. In this way several layers can be jointly loosened or milled stepwise transverse to the direction of the laying thereof or laid compacted—and possibly thereupon milled.

It lies within the scope of the invention for the compost material to be conducted as loose material to a piling station and shaped there into compacts and the compacts then stacked directly thereafter is spaced relation from each other. In this connection the defecation sludge, as deposition sludge of more than 80%, and preferably more than 90%—water content, is to be mixed with crushed portions of refuse and then compacted at the piling station.

In accordance with another feature of the invention, the compacts are produced with expression of liquid, which is used for the wetting of compacts which have already been stacked. By this process, several operations are saved and a simplified depositing of the compressed waste material is achieved. An improvement in the pressing process can furthermore be obtained in the manner that in accordance with the invention the waste material prior to the pressing is subjected to vibration.

In order to obtain improved drying, the compacts in accordance with the invention are piled with spaces between each other so as to form air channels and allow air to flow at least on two of their outer surfaces.

A particularly effective aerating or working of the heap of compostable material is obtained by blowing the air into the compost heap by means of aeration lances introduced at least vertically from the surface of the heap and at the same time a system of aeration channels or the like is produced by said aeration lances. The compost heap is traversed in checkerboard fashion, preferably completely automatically controlled, in its horizontal direction and/or vertical direction and subjected to blast an air.

In accordance with another feature of the invention, the temperature and/or the strength of the heap is determined in checkerboard fashion in its horizontal direction and/or vertical direction; the values thus obtained are introduced into a computer which, for instance, after a comparison of the actual values with preestablished desired values, sends pulses to control members for the feeding of the blast of air. This feed can be varied both in respect of its quantity and pressure, which permits regulating the consistency heap, without requiring the need for ordinary workers. The system in accordance with the invention can operate completely automatically.

The aerating of compost heaps can be effected in economical manner if gases given off by the heap are returned at least in part to the heap for the aeration thereof. In this connection, said gases should be cleaned in a circuit through which they pass and possibly fed in part to a so-called after-retting heap.

For this purpose an exhaust system for gases is provided above a heap of compostable material and is connected with an aeration system for the heap. The exhaust device is connected to at least one fan or blower the discharge end of which conducts the air or gas to the aeration system of the heap.

In accordance with another feature of the invention, liquid is removed from the gases in a condensate separator before they are returned to the heap, and these liquids can be used economically to spray the surface of the heap.

In order to facilitate the aeration of the heap, it has in accordance with the invention approximately vertical ventilation channels which are drilled into the heap and into which the gases are fed through a system of pipes in the supporting surface.

By the circuit described, an emanation-free composting is obtained without the use of special earth filters; the circuit permits optimal utilization of the substances and heat stored in the off-gases as well as, as a whole, an economical working of the compost.

This method is particularly favorable in the case of heaps which consist of thin layers which are laid one after the other and jointly aerated. Such heaps can be aerated in relatively favorable manner and accordingly it is more difficult for unpleasant odor-forming substances to develop as compared to the case of traditional compost heaps.

The system which is particularly suitable for carrying out the aeration in accordance with the invention is characterized by a lifting device which extends at least partially over the surface of the compost heap and on which at least one lance-like aeration member is movably arranged and connected with at least one air feed line.

It has proven particularly favorable to construct the aeration lance so that its length can be varied, for instance to make the tip of the aeration lance telescopically extractable from a tubular body. In this case, the tubular body is seated in fixed position—possibly pivotably, on the lifting device: from the tubular body the tip is movable downward into the heap up to a height determined by the control apparatus, at which height the aeration process then commences therein. For this purpose there is used at least one blast nozzle arranged at the tip of the lance, which nozzle may possibly in accordance with the invention be concealed upon the lowering of the aeration lance behind protection screens and brought into extended position when the intended place of aeration is reached.

It has been found favorable to provide, at least in the region of the tip of the lance, temperature sensors or pressure-measuring capsules in order to be able to use the aeration lance simultaneously for the above-described observation of the temperature and strength of the heap. The tip of the lance may also be provided with a sampling device.

It may be of importance, depending on the measured temperature of the heap, to spray the surface of the latter with water or the like, for which purpose spray members for the liquid are arranged at least on the aeration lance; further spray members can be connected directly with the lift device, for instance a conveyor or loading bridge.

In accordance with another feature of the invention, it is possible, due to the control and verification apparatus, to control the said temperature sensors, pressure-measuring capsules and spray or blast members so that the points of working, as seen in top view on the heap, form a checkerboard of selectable width of square and also are predeterminable in height, which leads to a three-dimensional coordinate system.

Another advantage of the apparatus of the invention is that as a result of the insertion of the aeration lances into the heap hollow spaces are produced which permit further aeration even after the removal of the aeration lances.

The delivery element is preferably constructed as a rake-type chain conveyor with rake flights or the like traveling around an approximately horizontally directed screen bottom and the delivery element is connected by an intermediate conveyor of variable length to the feed means; between the rake chain conveyor or a corresponding conveyor element and the feed means there is arranged, in accordance with the invention, within the path of movement of the compost material, a member for the accelerating of particles. As a result of these measures it is now possible to effect cleaning of the compost simultaneously with the depositing of the layers and to do this without any great expense. The separation between the hard substances and the finer compost material is effected upon acceleration by the bucket wheel; the hard particles of material thrown against the short conveyor rebound upwards against the baffle plate and are deflected by the latter onto a separating conveyor while the softer parts of compost are carried upward by the short conveyor and removed via its outlet end located on the top.

If the short conveyor, which is preferably provided with steel parts, is adjustable in its inclination, the boundary layer between hard substances and softer particles of material can be controlled as desired.

In accordance with another feature of the invention, between the telescope shaft or intermediate conveyor adjoining said steel conveyor belt on the one hand and the horizontal rake conveyor on the other hand there is arranged at least one blocking member which forms a switch in the path of conveyance; in one end position the compost flows to the rake conveyor while in the other end position of the blocking member the compost drops past the rake conveyor onto a bottom part arranged below it in accordance with the invention. The compost is conducted to the latter, in particular, when a relatively coarse compost is to be laid this compost is pushed over one edge of the bottom part and the surface of the layer thus produced increases the length of the slide path for the following particles.

Each edge of the bottom part defines a bottom opening of the conveyor device which extends below the rake type chain conveyor through which the compost leaving the openings of the rake type chain conveyor or of the screen bottom can fall. The bottom recess thus defines the size of the conical pile produced the surface of which is smoothed by a scraping edge of the conveyor device.

Said scraping edge can be a fixed part of the conveyor or loading bridge but it has proven favorable to make the scraping edge itself movable, for instance with the interposition of telescopic supports or the like.

In accordance with another feature of the invention, the apparatus is provided with hydraulically or pneumatically movable and electronically controlled telescopic columns which permit relative movement between the loading bridge on the one hand and the actual conveyor device and/or the milling mechanism on the other hand.

It furthermore lies within the scope of the invention for the conveyor device together with the milling mechanism and the additional aeration lances to form a compact unit whose individual parts can be controlled, even independently of each other.

With the compact system of the invention there can be effected a milling controlled in a coordinate system, a moistening of the heap of compost or other compostable material as well as the very effective aeration by the lances, the latter however only when the conveyor bridge is at a standstill. The positive aeration is controlled by an electronic coordinate control so that every point of the heap is aerated. There is the further advantage that due to the insertion of the air lances, hollow spaces or conduits are produced which form an aeration system after the removal of the lances.

The pressing device in accordance with the invention has movable press channels or the like for the production of compacts, each press channel being developed as stack member for the compacts. In this connection, the belt-like conveyor element should extend over the place of stacking and said element be connected with the movable pressing device. The pressing device should be able to be moved along the conveyor bridge and at right angles to it, which is effected by means of lift members to which the pressing device is fastened and by means of which it is moved in controllable manner between the conveyor bridge and the surface of the place of stacking.

Furthermore, it has been found to be particularly advantageous to provide below the bottom of the stacking station air channels, preferably in the form of a network, which conducts the air to the stacked compacts. In this connection, the surface at the stacking station is perforated in accordance with the invention so that the air can rise in vertical spaces remaining between the individual piles of the compacts.

It has proven particularly favorable to provide between the press channel and the associated conveyor element at least one bunker which receives the waste material delivered by the conveyor element of the conveyor bridge and forwards it in controlled manner to the press channel. The bottom of the bunker is preferably constructed as a conveyor belt with which there is associated, at the outlet of the bunker, a dosaging element in order to assure a controlled delivery of the waste material into the individual press channels.

The press channel is placed in vibration before the pressing process as well as during the pressing process by means of a vibration generator so as to accelerate the compacting of the compact. In this connection any liquid which may emerge is collected below the press channel and fed to spray nozzles. These nozzles are so arranged that they wet the compacts which have already been stacked by means of the liquid which has been collected.

The press channel and/or pressing device are controllable for horizontal displacement after each pressing process in order to simplify the depositing of the resultant compact on the surface at the stacking station or on another compact. In addition to or instead of the movability of pressing device or pressing channel, the bottom and/or wall of the pressing channel can be made displaceable or swingable in the region of the outlet so that the compact can readily slide out.

The pressing device is preferably controlled completely automatically in the manner that for the stacking of the compacts in columns it is moved stepwise approximately by the height of the compacts or even moved in different forms of so-called brick patterns in order to form the piles of compacts.

In order to achieve a favorable efficiency of the apparatus, a rotary drum is provided in front of the storage surface which drum has a mixing section for rubbish and sludge with inserts which effect a repeated reversal in direction of the material being mixed, a comminuting section in the form of a ball mill with walls having screening sections and a jacket surrounding the screen surfaces on their outer surface remote from the axis of the drum. It has furthermore been found favorable to arrange a screen drum behind the ball mill as seen in the direction of conveyance and to connect the fine-material outlet thereof with the outer space of the ball mill.

Further advantages, features and details of the invention will become evident from the following description of preferred embodiments taken in conjunction with the drawings.

BRIEF DESCRIPTION OF THE DRAWINGS

FIG. 8 is an enlarged longitudinal section through a part of FIG. 1.

DETAILED DESCRIPTION

Figure 1:
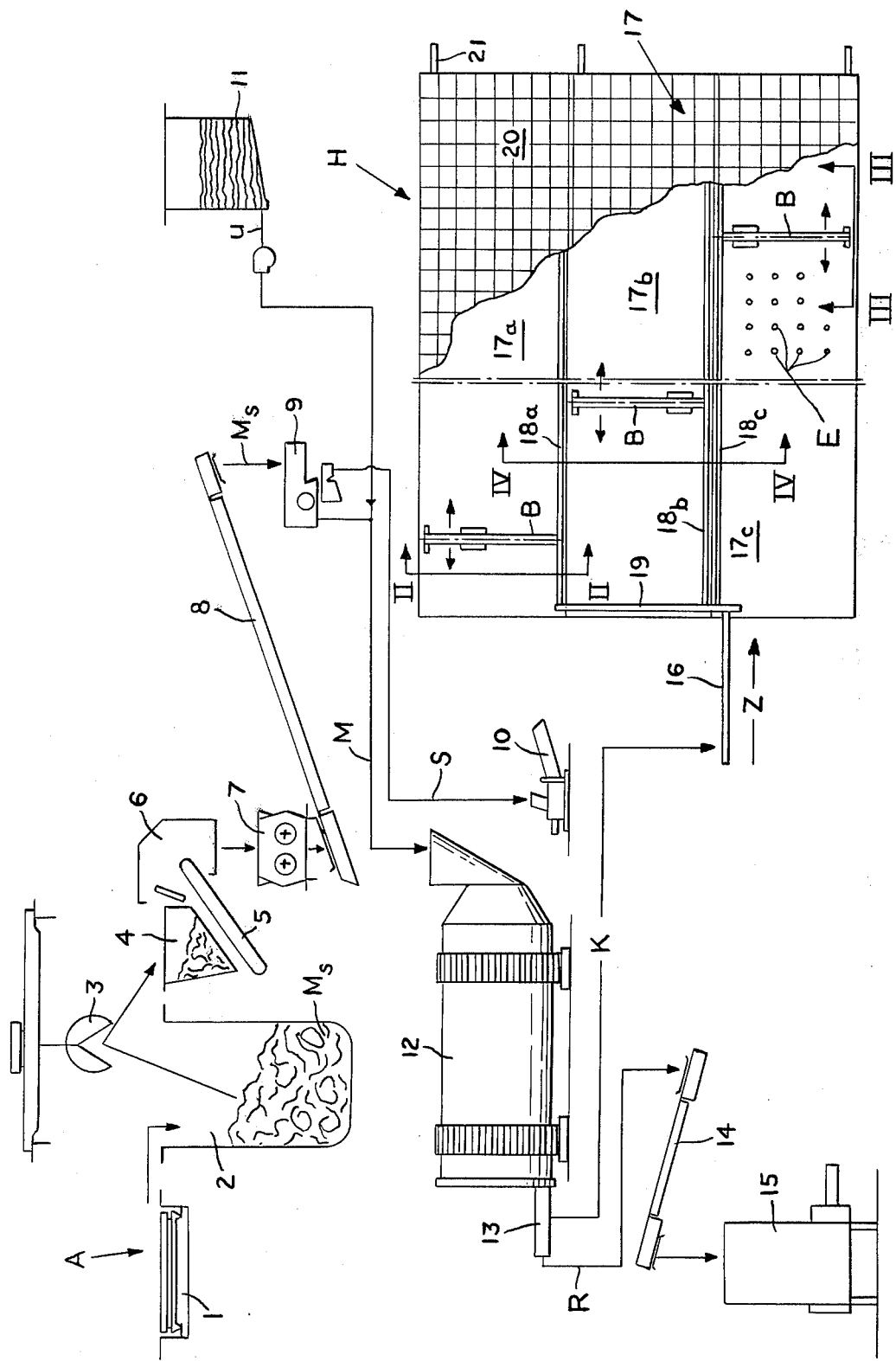
FIG. 1 diagrammatically shows a rubbish composting plant.

A plant for the preparation and composting of garbage to which defecation sludge has possibly been added (FIG. 6, 7) has a platform scale 1 at the reception point A behind which there is a deep bunker 2. Above the latter is provided a crane 3 which feeds garbage $M_s$ batchwise from the deep bunker 2 to a dosaging silo 4. From the latter the garbage $M_s$ passes via a conveyor belt 5 and a dosaging device 6 to a hammer mill 7. The garbage M which is comminuted in mill 7 is conveyed on a drag chain conveyor 8 to a magnetic separator 9 which on the one hand delivers scrap metal which has been removed to a scrap metal press 10 and on the other hand delivers the garbage M which is now free of scrap metal, together with the bottom discharge U of a defecation sludge tank 11, to a rotary drum 12. At the outlet 13 of said drum a separation of the raw compost K from the coarse screening residue R is effected; the latter is carried by another drag chain conveyor to a screen oversize bunker 15.

The raw compost K is transported on a conveyor member 16 to the deposit surface 17 of a composting station or retting building H (shown in top view in FIG. 1).

The deposit surface 17, in the example shown in FIG. 1, is subdivided in the charging direction z into three fields or retting-building segments $17_a$, $17_b$, $17_c$ each of which flanks along one field boundary a conveyor line $18_a$, $18_b$, $18_c$; these conveyor lines 18 are connected with the conveying member 16 by a transverse conveyor belt 19 which extends parallel to three travel or conveyor bridges B which are movable in the charging direction z.

Below the bottom 20 of the deposit surface 17 is a lateral underfloor conveyor 21 in each field 18 of FIG. 1.

Each of the conveyor bridges B has transverse supports 22 with lateral running gear, for instance rollers 23; the rollers are movable on travel bases or crane track rails 24 of a supporting frame 25 consisting of vertical beams 26 of height i and transverse or roof supports 27.

Figure 2:
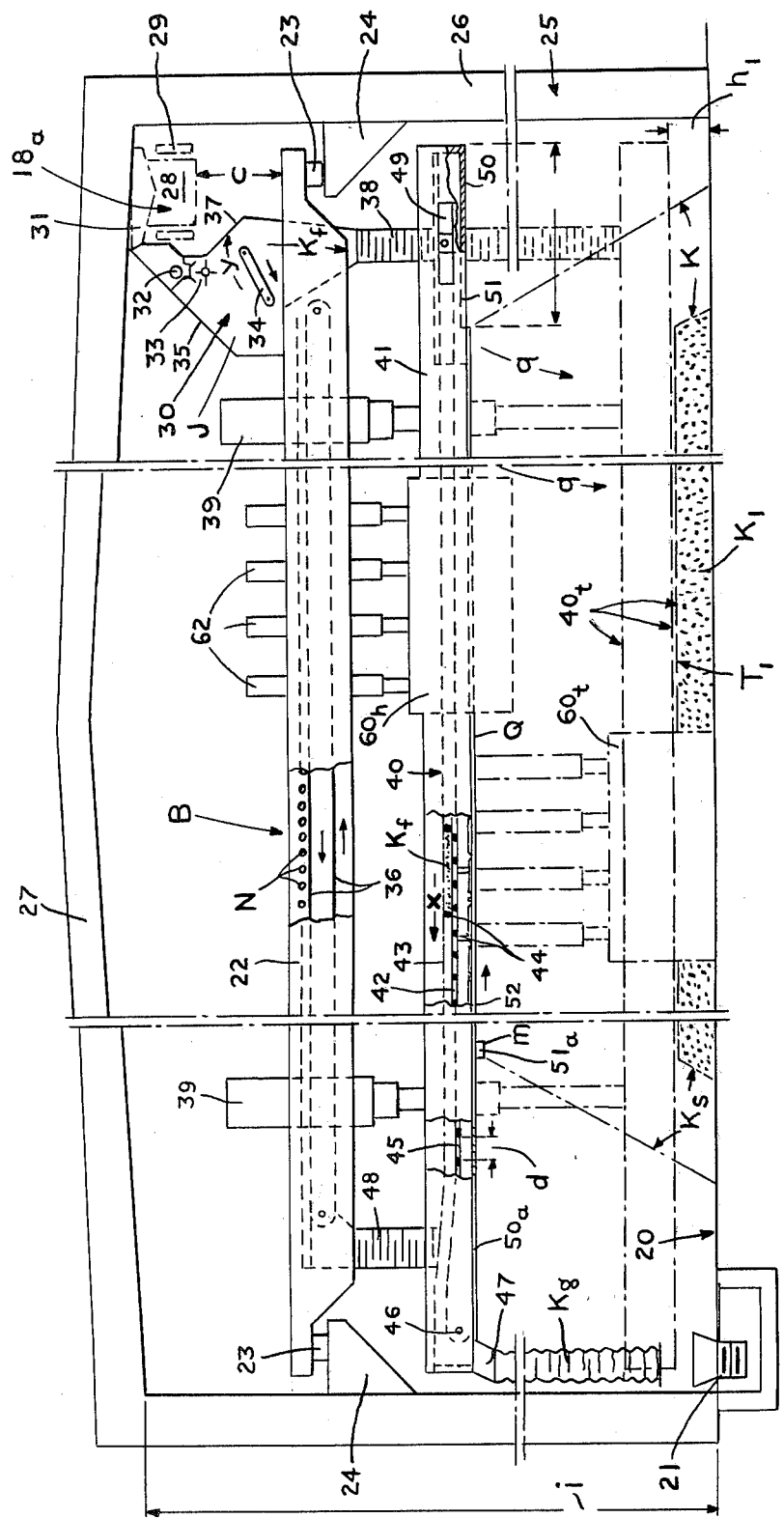
FIG. 2 shows on a larger scale a detail along the line II—II with front view of a conveyor bridge.

In FIG. 2, at the distance c above the right-hand travel base 24 the conveyor line $18_a$ can be seen in the form of an endless belt 28 stretched between drums 29. On or between the transverse supports 22 of the conveyor bridge B there is arranged a transfer device 30 the scraping arm 31 of which conducts the crude compost K delivered to it into the inside J of the transfer device 30 where it is picked up by a distributing worm 32 and delivered to a bucket wheel 33. The latter accelerates the raw compost K and throws it against an inclined steel conveyor belt 34 of relatively short lengthwise extension. The hard particles N, due to the adjustable inclination of the steel conveyor belt 34, either slide down from the latter or strike upwards against a plate 35 which deflects them to an upper transverse conveyor belt 36.

The fine compost $k_f$ is carried along by the steel conveyor belt 34 (or in an embodiment not shown in the drawing by an inclined stationary plate with lower impact nose) in the direction indicated by the arrow y and drops along the wall 37 of the transfer device 30 which is opposite the said impact plate 35 down through a telescopic shaft, for instance a bellows 38, onto a conveyor device 40 which is arranged below the transverse support 22 and is connected with the latter by telescopic pistons 39. The distance between said conveyor device 40 and the transverse support 22 is adjustable by means of the telescopic pistons 39.

The main part of the conveyor device 40 comprises a screen bottom 42 resting between cross members 41 on both sides of which endless conveyor chains 43 move in the direction of conveyance x on transverse bars 44 fastened to them; the required chain drums and drives have not been shown in order not to clutter the drawing.

The fine compost $K_f$ which drops onto the screen bottom 42 is carried along by the transverse arms 44 and drops down along the conveyor path of the length n through the screen-bottom openings 45; coarse parts $K_g$ which remain on the screen bottom 42 are delivered at the end 46 of the rake type chain conveyor 42-45 to a vertical telescopic shaft 47 and pass through the latter onto the lateral underfloor conveyor 21 described above; the conveyor 21 discharges the coarse parts $K_g$ as well as the portions of hard material N coming from the upper cross conveyor 36 through a bellows 48.

Upon the conveying of compost K whose particle size lies essentially above the size d of the screen-bottom openings 45, a slide 49 lying below the bellows 38 (to the right in FIG. 2) is opened whereby the compost K drops onto a bottom plate 50 of the length e; over the edge 51 of said plate the compost K can drop downwards in the direction indicated by the arrow q.

In order to produce a first compost layer $K_1$ of height $h_1$ of, for instance, 40 mm the conveyor device 40 is lowered on the hydraulically or pneumatically actuated telescopic pistons 39 into the position shown in chain-dotted outline $40_t$ in FIG. 2 in which, due to the telescopic shafts 38, 47, 48 it remains connected to the feed and delivery members $18_a$, 21, 36. Within the region of the recess 52 of the conveyor device 40 which is defined by the bottom-plate edge 51 and (to the left in FIG. 2) $51_a$ of another bottom plate $50_a$, there is produced in the manner described a dump cone (side limits $K_s$) with surface $T_1$ smoothed by the stripping edge(s) Q of the conveyor device 40. Upon the conveying of coarse compost K the latter is pushed over the edges 51 of the bottom plate 50 and then over the surface $T_1$ of the dump cone $K_s$ already present. Here in order to distribute the compost K the flights or rakes 44 in the lower course of the rake-type chain conveyor 42-45 can be moved in the direction indicated by the arrow x; the direction of conveyance of the rake-type chain conveyor 42-45 has therefore been reversed here.

At the two edges 51, $51_a$ of the bottom plates 50, $50_a$ which determine the lateral edges of the deposit cone $K_s$ or of the flat heap, there can be provided electric level controls m which supervise the conveying process and impart a pulse to the conveyor bridge B when the latter should shift by the width v of the rake-type conveyor 42-45 in order to commence a new compost strip $v_1$. In this way compost areas of a width of about 20 m and a length of about 100 m with the height $h_1$ are to be produced.

Figure 3:
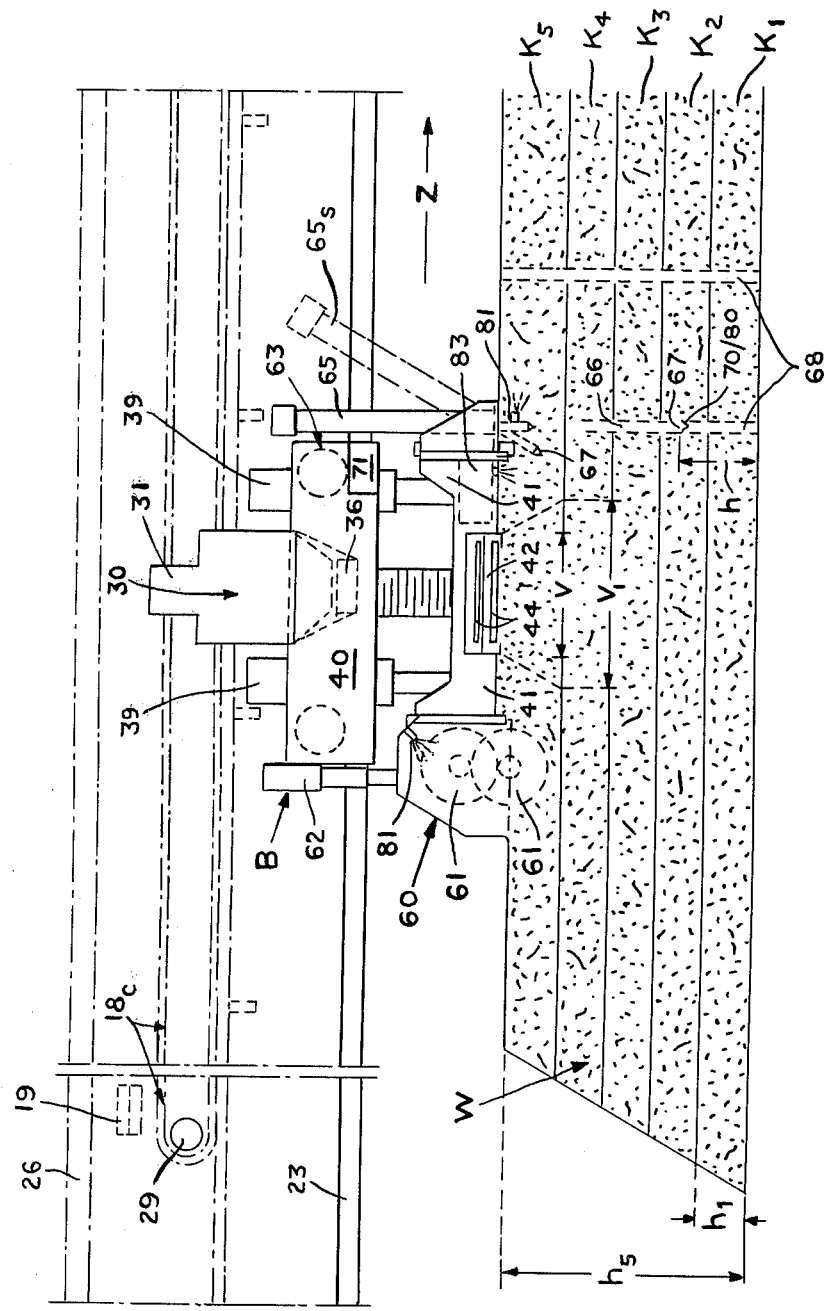
FIG. 3 shows the conveyor bridge of FIG. 2 in side view in an enlarged partial section through the plant in FIG. 1 along line III—III thereof.

FIG. 3 shows a compost heap W of height $h_5$ consisting of a plurality of compost layers $K_1$ to $K_5$ laid in the manner described, into which layers there is lowered a milling mechanism 60 with milling cylinder 61 in order to loosen the compost heap W which has been compacted as a result of lengthy standing. Different vertical positions of the milling mechanism 60 suspended from the vertical columns 62 are shown at $60_h$ and $60_t$ in FIG. 2.

With the supporting structure of the conveyor bridge B therefore the compost heap W is both prepared and milled; while the production of the compost strips takes place in the direction of the arrow x, the milling cylinders 61 move over paths in or opposite the direction of the arrow z.

On the front side 63 of the travel conveyor bridge B which is located opposite the milling mechanism 60 there are swingably arranged telescopic lances 65 whose points 66 can be lowered, vertically or inclined, as shown in chain dotted outline $65_s$ into the compost heap W. These lance tips 66 are equipped with nozzles 67 through which air can be blown at in an adjustable height h as shown in dotted lines in FIG. 3 at given checkerboard points E (FIG. 1).

After removal of the lances 65, so-called conductor pipes remain as additional aeration channels in the compost heap W.

Both the conveyor during the operation of the production of the compost heap and the milling process or the injection of air at preselected checkerboard points E is controlled entirely automatically so that each point of the compost heap can be optimally aerated.

For example, in one preferred embodiment of the telescopic lances 65 it is possible, by means of temperature detectors 70 provided in addition at their points 67, to determine the compost temperature at given points and to feed the actual values to a control device 71 in which the required aeration is calculated and the control of the system effected on basis of the resultant values.

In a further embodiment, pressure-measuring members 80 — or sampling devices — can also be provided on the telescopic lance 65.

Spray nozzles 81 are mounted on milling device 60 and on telescopic lance 65 for mounting compost K. The feeding of water from the water lines or a water tank 82 can also be controlled by the control device 71.

A spray system 83 which extends over the entire length of the conveyor device also serves for the purpose described.

The system described makes it possible to keep the required composting area as small as possible and to effect the conveying and aerating processes with a single embodiment of a conveyor bridge B. The bottom $K_1$ of the heap W which is produced in any desired height can also be aerated; the remaining pipes 68 represent aeration centers distributed in checkerboard fashion.

The three above described processes of conveying, milling and aeration are preferably electrically interconnected so that each operation can be carried out separately by a program-controlled electrical system and leads to a modern area-composting with good additional comminution and high aeration effect.

Figure 4:
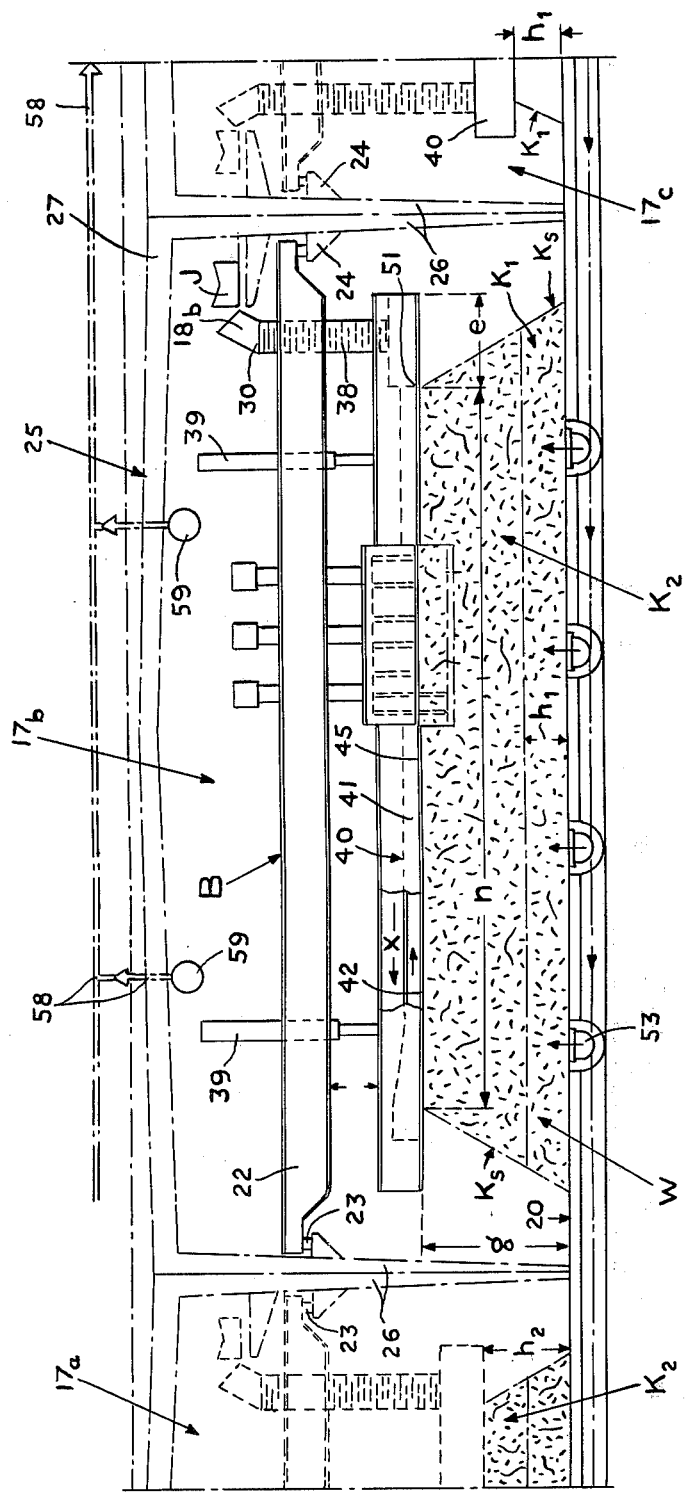
FIG. 4 shows an enlarged detail section of another embodiment taken approximately along the line IV—IV in FIG. 1.

In FIG. 4, showing a comparison of the retting hall segments $17_c$, $17_a$, $17_b$ the process of producing a compost heap W consisting of several layers $K_1$, $K_2$, etc. can be clearly noted.

Figure 5:
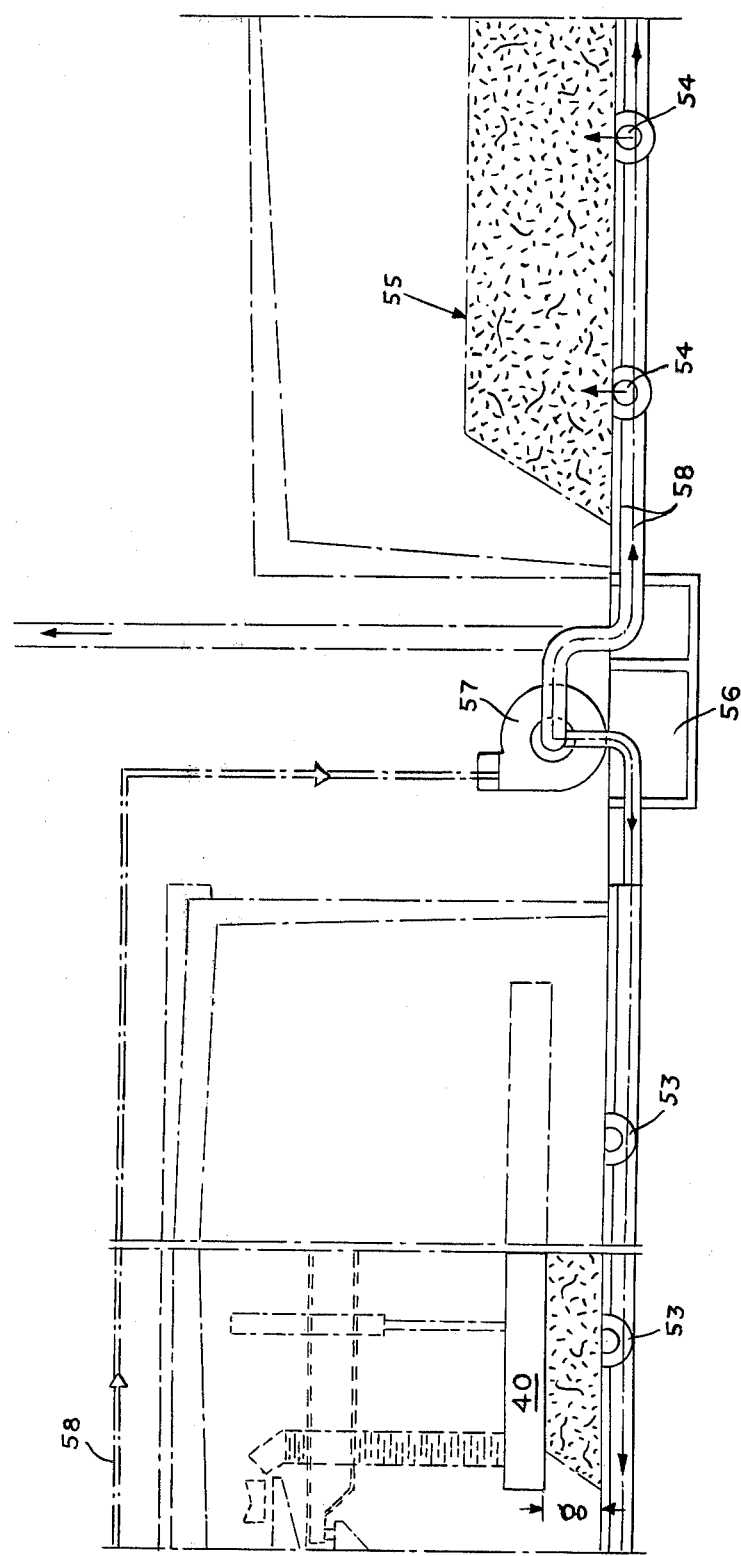
FIG. 5 shows a further section, adjoining the right side of FIG. 4, through the plant.

Above the compost heap W there are located exhaust ducts 59 which extend transversely to the direction of conveyance x and/or to the conveyor device 40 arranged at a distance g from the bottom 20, which ducts are connected to an air supply network; the latter is indicated by double dot dash lines 58 in FIGS. 4 and 5 and connected with blowers 57.

By the exhaust system 59, 58 contained in the retting or composting hall H, the air is fed to the blower 57 and a small part of the air or of the gases is fed again to the individual heaps through underfloor channels 53 for aeration from the bottom. A part is brought through bottom aeration channels 54 to an after-retting place 55.

The gases pass from the blower 57 into individual calming chambers 56 where the water of condensation produced is taken up by a sump pump (not shown) and again brought into the composting plant. For this there are used water nozzles in the region of the compost heap W; these water nozzles have been omitted in the appended drawing for the sake of clarity. There is produced a closed circuit with a considerable quantity of so-called earth-filter surfaces which remove environmentally injurious contaminants from the discharged-gases in a relatively inexpensive manner.

The rubbish described with reference to FIGS. 6 and 7 has been brought together with the non-dewatered settling sludge U, of about 90% moisture content, of the defecation sludge or settling tank 11 (FIG. 1). The feeding of the garbage to the travel bridge P and from there by the transfer device 30 to the transverse conveyor belt 36 for hard particles N or through shaft 38 onto a conveyor belt $40_b$ for fine compost $K_f$ takes place in the manner described.

The fine compost $K_f$ is removed from the conveyor belt $40_b$ by flights 72 and slides laterally into the bunker 73 of a briquette press 74. The latter is arranged below the transverse support 22 on a cross member 41 which can be displaced vertically by telescopic pistons 39. Thus it is also possible to move the briquette press 74 together with the conveyor bridge P in the direction of travel x of the latter as well as transversly thereto on the cross member or the conveyor belt support 41 respectively.

The bunker bottom 75 is formed by a conveyor belt which conducts the fine compost $K_f$ to the outlet opening 77 of the bunker 73 which is provided with a dosaging device and thus to the inlets 78 of several press channels 79 provided below discharge opening 77. When the said press channels are filled, a press piston 85, associated with each press channel 79, compresses the fine compost $K_f$ against a press plate 86 forming the end of the channel to about one-third of the original length of filling f. The press pistons 85 operate synchronously or, in the case of an embodiment not shown, in cyclic manner with respect to each other. The number of press channels 79 per briquette press 74 is variable as is also the number of briquette presses 74 per conveyor bridge P.

During the pressing of briquettes D the fine compost $K_f$ is subjected to vibrations by an imbalance member 64 in order to effect a precompressing of the pressing material.

After the pressing of the briquettes D, the press plates 86 are removed from the press jaw 88 by lift elements 87 and the briquettes D are pushed out. For this purpose, either the press channel 79, or the entire briquette press 74, or a movable bottom plate 89 is pulled back by a mechanism not shown in the drawing in order to be able to deposit the briquettes D directly at the stacking station.

Figure 6:
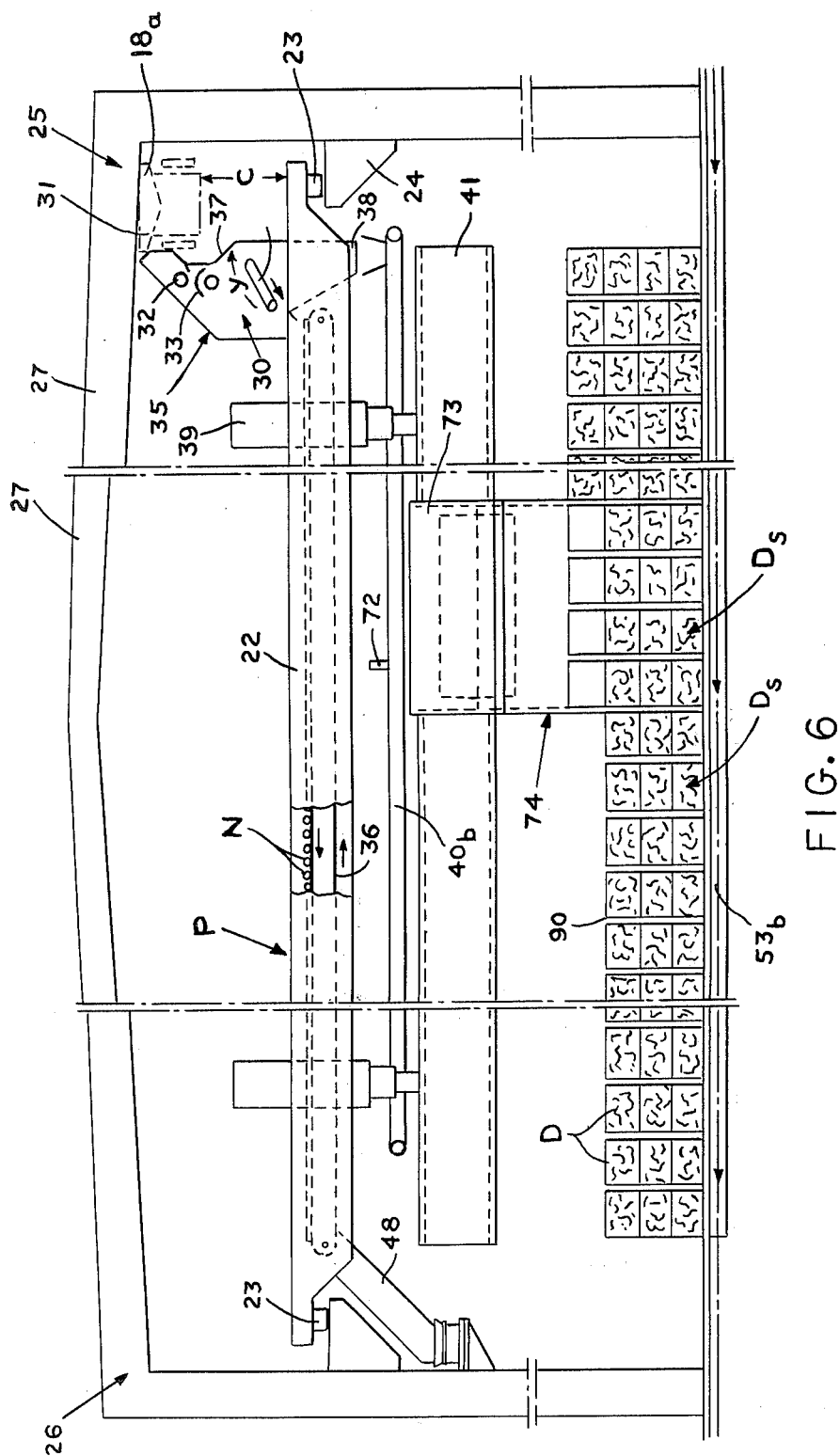
FIG. 6 is an enlarged detail section of another embodiment of the conveyor bridge, taken along line II—II in FIG. 1.
Figure 7:
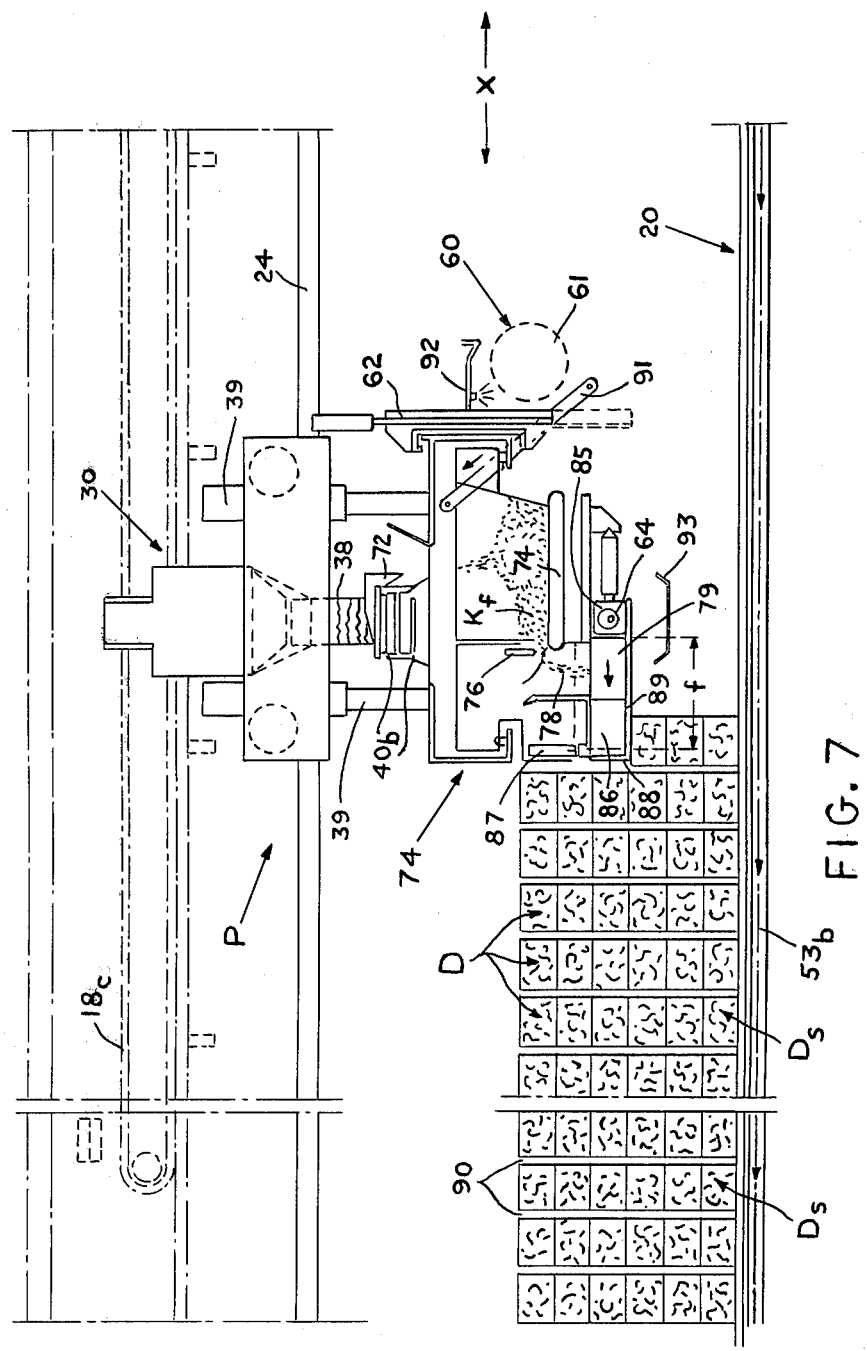
FIG. 7 shows the conveyor bridge in FIG. 6 in a side view in a somewhat enlarged partial section taken along line III—III in FIG. 1.

The stacking of the briquettes D is effected in layers in separate columns $D_s$ between which, as shown in FIG. 6, seven vertical channels 90 are produced; the latter are connected by bottom holes (not visible in the drawing) to the air feed network $53_b$ so that a good aeration of the piles of briquettes is effected. In another embodiment, the briquettes D can be stacked in the manner of a stretcher or binding bond—and therefore in rows staggered to each other—in order to obtain better stability; in this case the individual briquettes D are placed at a distance from each other in order to assure horizontal aeration. Other brickwork bonds are also possible as a pattern for the stacking of the briquettes.

The briquettes D or compacts are held in the stack form for about twenty days and then milled by a milling mechanism 60 consisting of milling rollers 61 and thus become part of a compost heap. The milling mechanism 60 is provided here—as shown in FIG. 7—in the briquetting press 74 and is movable vertically by means of a traveling piston 62.

The heap which is produced during the milling process from the briquettes D is again fed by a conveyor belt 91 to the briquette press 74 or its bunker 73. Before and/or during the milling process, spray nozzles 92 effect the wetting of the briquettes D or the heap milled from them. These spray nozzles 92—and also others not shown in the drawing—are fed with industrial water or filtrate; the latter can be produced during the pressing process and is then collected in gutters 93. The spray water lines have not been included in the drawing.

FIG. 8 shows a longitudinal section through the rotary drum 12 in a special embodiment for operating with garbage M and defecation sludge F, both of which are charged into the drum inlet 94. On the shaft G of the rotary drum 12 there are arranged—turning synchronously or controlled with respect to each other—a mixing drum section 95 of a length b of about 250 cm with built-in baffles 96, a ball mill 97 with filling balls 98 and replaceable screen impact tray 99 as well as a screen drum 100 which receives the garbage overflow t.

The introduced garbage M is mixed in the mixing drum section 95 with the defecation sludge F to produce a garbage moisture content of about 50%, the baffles 96 causing a repeated reversal of the direction of flow. In the ball mill 97 the iron filling balls 98 break down large pieces of garbage of the heap discharged via an accumulation stage a from said mixing drum section. This screened fine material is collected in a jacket 101 surrounding the screen impact tray 99 and discharged at u. Adjustment of the moisture content of the fine material is effected by means of a bucket mechanism 102.

The mill overflow t passes via the accumulation edge 103 into the after-screening drum 100 where fine material is conducted via screens 104 through a collecting space 105 to the annular space 106 between jacket 101 and screen baffle tray 99.

The screen residue r discharged from the screen drum outlet 107 amounts to less than 20% of the amount M-F charged.

SUMMARY

This invention relates to a process and apparatus for the preparation of compostable material on a storage surface with a displaceable loading bridge spanning the surface at a distance above it as well as a delivery member arranged on said bridge facing said storage surface and connected to at least one conveyor means which brings the material to said member.

In known methods, for the forming of such compost heaps, portal frames are used from which the compost drops in part in very large lumps and forms individual conical heaps; they produce an undulated surface of the heap and thus require expensive smoothing work. Furthermore, these compost heaps must be turned upside down or aerated several times during the course of their existence. With the aeration systems customary up to the present time only certain edge areas were aerated while between them columns of compacted compost or the like remain, leading to an extremely malodorous heap.

By the present invention it is possible in a manner which is as completely automatic as possible to produce well aerated heaps which, with constant volume require relatively little area and are compatible with the environment. Furthermore a high efficiency of the system is desired.

The solution is obtained in the manner that a thin layer of compost material of, for instance, a height of 40 mm is produced from strips which are laid with their longitudinal edges alongside each other, at least one additional layer of this type being placed on top; in this connection during the laying of the layer hard substances are removed from the compact material by acceleration of the particles of material and separation between components which have good and poor rebound properties. Furthermore, the compost material is conducted as loose material to a piling station and shaped there into compacts which are immediately thereafter stacked at a distance from each other, the defecation sludge as deposition sludge of more than 80% moisture being mixed with crushed portions of refuse and then compacted at the piling station. Furthermore the compost heap is aerated by means of air which is blown into the compost heap by means of aeration lances introduced at least vertically from their surface; at the same time a system of aeration channels or the like is produced by the aeration lances.

In the apparatus of the invention there is provided a horizontal belt-shaped conveyor member which spans the supporting surface is movable approximately parallel to the supporting surface and inclined or perpendicular thereto by means of a lift element or the like. On the conveyor or loading bridge or the lift element thereof there is provided a movable milling or similar loosening device which is movable at least vertically with respect to and/or together with the same and/or at least one pressing device with movable press channels or the like to produce compacts, each press channel being constructed as a stacking member for the compacts or is provided with such a member.

On the lift element which at least partially extends over the surface of the compost heap there is movably arranged at least one lance-shaped aeration member possibly of variable length, which is connected with an air feed line.

Over the compost heap there is arranged at least one suction or exhaust device connected to at least one blower and its blower end is connected to the aeration system of at region one heap and/or one after-retting place. Furthermore, in front of the storage area there is arranged a rotary drum which has a mixing section for garbage and sludge with inserts which effect the multiple reversal of direction of the material being mixed, a comminution section in the form of a ball mill with walls having screen surfaces as well as a jacket which surrounds the screen surfaces on the outer surfaces thereof remote from the axis of the drum.

I claim:

1. A process for preparing compostable material on a storage surface with a displaceable loading bridge extending over the surface at a distance thereabove, and a delivery member arranged on said bridge in facing relation with said storage surface and connected to at least one conveyor means which brings the material to said delivery member, said process comprising feeding the compost material as loose material to a compression station carried on the bridge, compressing the compost material at said compression station to form briquetts, the compost material being compressed in a press which is suspended from the bridge and is displaced above the storage surface in the course of forming said briquettes, depositing said briquettes on one another in adjacent, spaced vertical rows on said storage surface to directly stack said briquettes in said spaced rows on the storage surface, said compost material comprising defecation sludge of more than 80% moisture mixed with comminuted portions of garbage whereby the compost material gives off gases, the compressing of the compost material to form briquettes causing expressing of liquid, the process further comprising wetting the briquettes which have already been stacked with the expressed liquid and returning gases given off by the compost material at least in part to the material to effect aeration thereof.

2. A process as claimed in claim 1 comprising vibrating the compost material in a compression zone prior to the compression of the compost material to form the briquettes whereby the compost material undergoes a pre-compressing stage.

3. A process as claimed in claim 1 wherein the compost material is composed of fine and coarse particles, the method further comprising separating the coarse particles from the compost material before the compost material is fed to the compressor station by throwing the compost material against an inclined conveyor surface and separating the coarse particles from the compost material on the basis of greater rebound of the coarse particles.

4. A process as claimed in claim 1 further comprising aerating the compost material by blowing air into the compost material via aeration lances which form a system of aeration channels in the material.

5. A process as claimed in claim 4 comprising measuring at least one of the temperature and strength of the compost material in checkerboard manner, scanning the compost material in checkerboard manner, and feeding blast air at determinable insertion points into the compost material at a rate and pressure controlled as a function of the measured temperature and strength of the material.

6. A process as claimed in claim 1 wherein a part of the gases is conducted through an after-retting heap.

7. A process as claimed in claim 6 comprising removing liquid from the gases given off by the compost material, and spraying at least one of the compost material or after-retting heap with the liquid removed from the gases.

* * * * *

UNITED STATES PATENT AND TRADEMARK OFFICE
CERTIFICATE OF CORRECTION

PATENT NO. : 4,326,874
DATED : April 27, 1982
INVENTOR(S) : Werner Burklin

It is certified that error appears in the above—identified patent and that said Letters Patent is hereby corrected as shown below:

On the title page add:
-- Foreign Application Priority Data

March 13, 1978   Germany.......... P 28 10 342.1
March 14, 1978   Germany.......... P 28 10 911.7
May 3, 1978      Germany.......... P 28 19 360.4 --

Signed and Sealed this

Twenty-third Day of August 1983

[SEAL]

Attest:

GERALD J. MOSSINGHOFF

Attesting Officer           Commissioner of Patents and Trademarks